United States Patent [19]
Johnson

[11] 3,830,008
[45] Aug. 20, 1974

[54] FERRULE STRUCTURE UTILIZING INTEGRAL MALE AND FEMALE PORTIONS

[75] Inventor: Paul C. Johnson, Spirit Lake, Iowa

[73] Assignee: Berkley & Company, Inc., Spirit Lake, Iowa

[22] Filed: July 17, 1972

[21] Appl. No.: 272,379

[52] U.S. Cl. ............................. 43/18 R, 403/361
[51] Int. Cl. ..................................... A01k 87/00
[58] Field of Search ........ 43/18 R, 18 GF; 287/126; 403/361

[56] References Cited
UNITED STATES PATENTS
264,243   9/1882   Chubb ............................ 43/18 R X
3,186,122   6/1965   Clock et al. ..................... 43/18 GF FOREIGN PATENTS OR APPLICATIONS
1,482,953   4/1967   France ............................ 43/18 R Primary Examiner—Russell R. Kinsey
Assistant Examiner—Daniel J. Leach

[57] ABSTRACT

A fishing rod having a flexible shaft which tapers substantially continuously from the butt end to the tip end and comprises a plurality of individual segments coupled together by means of integrally formed coupling ferrules. The individual ferrules are arranged to releasably retain the individual segments together as a pair, with these ferrules including a male prong portion extending from the forward end of the rod segment, along with a matching female ferrule portion in the rear portion of the next succeeding segment. The angular tapers of the male and female ferrule segments are matching, one to another, with the angular taper of each ferrule segment being greater than that of the surrounding outer shaft surface. In order to avoid areas of stress concentration, the wall thickness of the male prong portion is substantially uniform along the axial extent thereof, and the female ferrule portion is provided with zones of greater cross-sectional thickness in the ferrule transition areas.

6 Claims, 7 Drawing Figures

FERRULE STRUCTURE UTILIZING INTEGRAL MALE AND FEMALE PORTIONS

BACKGROUND OF THE INVENTION

The present invention relates generally to improved flexible shaft structures, and more particularly to an improved flexible shaft specifically adapted for use as a fishing rod, with the shaft being formed of a plurality of segments releasably coupled together by means of improved ferrules having characteristics enhancing the durability and flexural characteristics of the assembled shaft. Fishing rods fabricated in accordance with the present invention have the characteristic of a substantially uniformly bending or flexing shaft element, which, when assembled, has a generally uniform and substantially continuous taper from the butt end to the tip end.

In the fabrication of fishing rod structures, it is frequently desirable to produce a rod which is formed of a plurality of individual segments. In forming the coupling ferrules to be utilized in assembling the rod, care must be taken so as to avoid establishing areas of stress concentration, as well as to avoid unusual or difficult operations which render the structures extremely costly to fabricate. The concept of the present invention provides a segmented rod which utilizes integrally formed ferrules for coupling the segments together, and wherein the ferrules are uniformly and predictably formed from one segment to another. Accordingly, the segments are interchangeable, from one unit to another, and do not require custom fitting or custom grinding either during production, or when the consumer may be required to replace a damaged or broken segment.

Fishing rods having uniformly tapering contours or characteristics are normally desired, and such a rod may be formed readily by utilizing a single shaft, preferably a hollow core shaft. Fishermen normally prefer to have a rod which can be disassembled when not in use, so as to facilitate more convenient handling, transporting, or storage. Whenever a rod shaft is designed to be broken down in this fashion, certain anomalous characteristics may develop which are in turn reflected by adverse conditions for the purchaser or user. The coupling ferrule must be simple, reliable, and durable, and also capable of ready replacement if damaged or destroyed. Also, it is necessary to avoid a structure which contributes to localized fatigue from the generation of local areas of stress concentration in the shaft, which areas can be generated during normal use of the rod, unless designed so as to avoid the formation of areas of stress concentration.

SUMMARY OF THE INVENTION

In accordance with the present invention, a flexible shaft is provided which is particularly adapted for use as a fishing rod, with this shaft being formed by coupling together a plurality of hollow core segments utilizing ferrules of improved structural design. These ferrule elements are formed integrally with the individual rod segments, with the forward tip end of each segment carrying the male prong ferrule portion, and with the rearward tip end of each segment carrying the female ferrule portion. The ferrule assembly is arranged to releasably retain the mating or adjoining segments together and thus form the composite or unitary rod structure. In the formation of the individual segments, care is taken to carefully match the outer periphery of the male prong member to the inner periphery of the female ferrule portion, with the prong member having a frusto-conical configuration. In order to provide continuity of taper throughout the axial length or extent of the shaft, and in order to accommodate the use of simple molding or forming techniques, the forward tip end of each adjoining segment is subjected to a grinding operation which changes the "as molded" configuration to a controllable and predictable ground configuration which renders the individual segments interchangeable, one to another, and with the "as molded" configuration being contoured in order to accommodate surface grinding without adversely affecting the structural characteristics or other features of the device. The female ferrule portion is designed to receive the finished male prong portion, with care being taken in the design of the female ferrule to avoid the establishment of areas of stress concentration. By this technique, it is possible to provide a unitary rod structure with a substantially continuous periphery extending along substantially the entire extent of the shaft, with the ferrules being durable, rugged and reliable in their locking action on the rod segments being joined.

Therefore, it is a primary object of the present invention to provide an improved ferrule design for coupling individual rod segments together, with the ferrules being integrally formed with the rod segments per se.

It is yet a further object of the present invention to provide an improved ferrule means for coupling individual rod segments together to form a unitary shaft, wherein the ferrule means includes male and female portions, and wherein the design eliminates the establishment of areas of stress concentration in the ferrule, particularly in the female ferrule portion.

It is yet a further object of the present invention to provide an improved ferrule means for coupling individual rod segments together to form a unitary shaft, wherein the ferrule means are integrally formed with the individual rod segments, and wherein the contour of the finished rod shaft is substantially uniform from one end thereof to the other.

It is yet a further object of the present invention to provide an improved ferrule means for coupling individual rod segments together to form a unitary shaft, wherein the ferrule portions are integrally formed with the shaft, and wherein the structures accommodate conventional molding and grinding techniques without requiring unusual operations to be undertaken.

Other and further objects of the present invention will become apparent to those skilled in the art upon a study of the following specification, appended claims, and accompanying drawings.

DESCRIPTION OF THE PREFERRED EMBODIMENT

Figure 1:
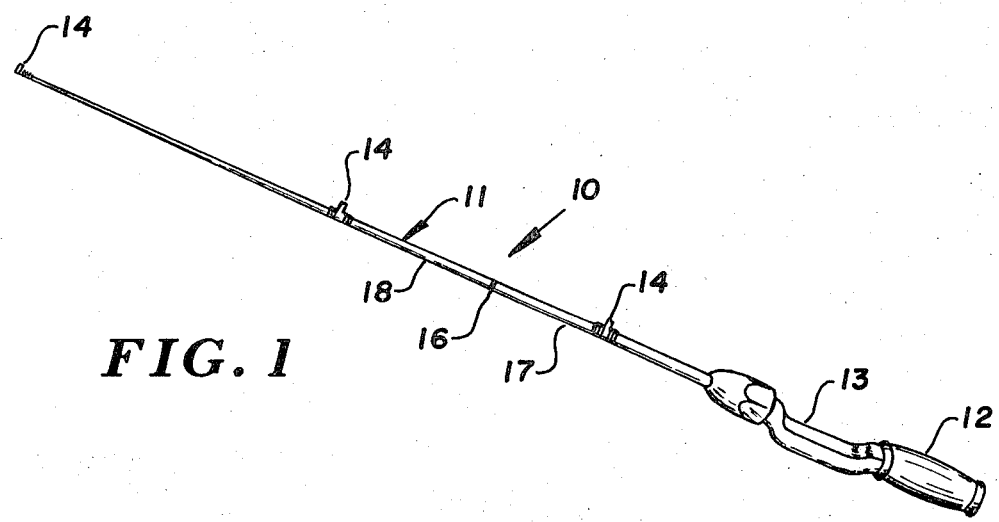
FIG. 1 is a perspective view of a flexible shaft in the form of a fishing rod employing the coupling ferrules of the present invention.

In accordance with the preferred modification of the present invention, and with particular reference to FIGS. 1–4 of the drawings, the rod member or structure generally designated 10 includes a shaft portion 11 and a gripping handle portion 12. As is indicated, gripping portion 12 is provided with an area as at 13 for seating a reel thereon, while line guides 14—14 are disposed in spaced relationship along the axis of the shaft 11. The coupling ferrule is shown in the structure as at 16, which separates the rod shaft into a butt segment 17 and a tip segment 18.

Figure 2:
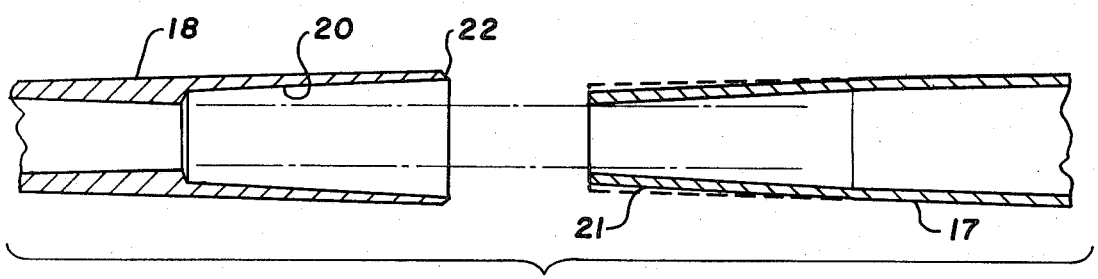
FIG. 2 is an exploded detail view on a slightly enlarged scale, showing the structure of the coupling ferrule used in the shaft forming the fishing rod of FIG. 1, with the surface of the male prong portion shown in solid lines being the surface of the ferrule in its finished or "as ground" state, and with the dotted line showing the surface of the ferrule "as molded;"
Figure 3:
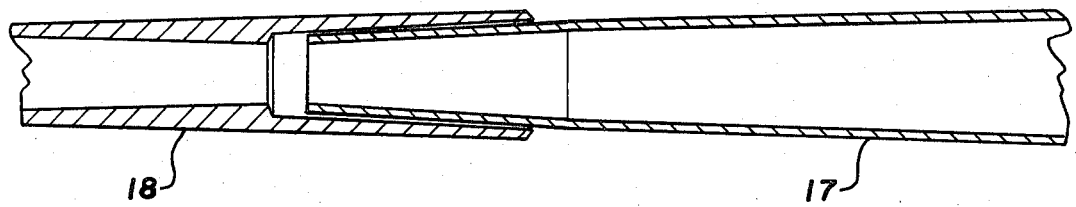
FIG. 3 is a detailed view similar to FIG. 2 showing the disposition of the coupling ferrule in an intermediate coupling position, and immediately prior to full seating of the prong portion within the female bore portion.
Figure 4:
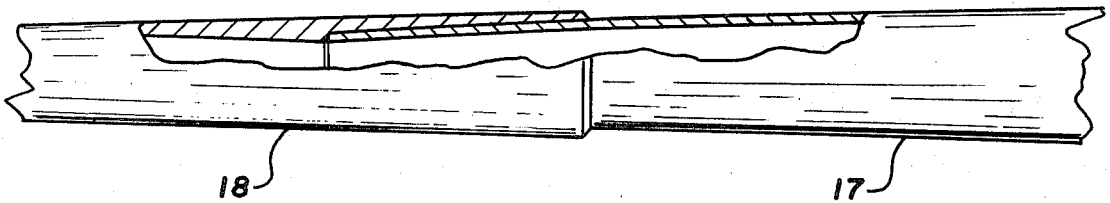
FIG. 4 is a view similar to FIG. 3, and showing the disposition of the individual rod segments with the male prong portion fully seated within the female socket bore.

The details of the ferrule coupling are shown in FIGS. 2–4 of the drawings. In this connection, FIG. 2 illustrates the butt portion 17 in a form both in the "as molded" form as well as in the finished or "as ground" form. Following the preparation of these surfaces, the individual segments 17 and 18, as well as any other segments which may be utilized to form the composite rod structure, are adapted to be releasably retained together to form a single unitary composite structure of hollow core construction. In the unitary composite structure, the shaft tapers substantially continuously along a generally predetermined angular taper from the butt end to the top end. While this angular taper may have an absolute value which varies modestly from one end to the other, it will be appreciated that the taper is generally continuous and substantially uniform along the extent of the shaft.

In forming the ferrule means, it will be noted that the female ferrule component comprises a prong-receiving bore such as is illustrated at 20, with the inner angular taper of this bore being somewhat greater than that of the surrounding outer shaft surface. This is apparent from an inspection of the female ferrule portion shown in FIG. 2, wherein the cross-sectional thickness tapers from left to right in the view.

The male ferrule component comprises a prong tip portion as at 21, with this tip portion having an outer surface with an angular taper greater than that of the axially adjacent outer shaft surface. It will be further seen that the angular taper of the male prong portion substantially matches the taper of the prong-receiving bore 20. In addition, the wall thickness of the male prong portion is substantially uniform from end-to-end, with this wall thickness conforming substantially to that of the remaining balance of the integral shaft portion.

In forming the male prong component, the "as molded" portion is formed with a configuration such as is illustrated in FIG. 2, the outer surface being shown as dashed lines. This portion of the device is formed in this fashion in order to accommodate subsequent grinding and ultimate reduction of the outer diameter of the prong tip portion of the segment 17. The grinding permits obtaining a line-to-line fit with the female ferrule cover area, with the individual ferrule components corresponding in size and taper. With further attention being directed to the tio portion 18, it will be observed that the female ferrule component forms a cover element for the ferrule joint. The annular solid wall portion forming the end of the female element or cover as at 22 is chamfered so as to enhance the smooth appearance of the structure.

The appearance of the structure during and after arranging the coupling is shown in FIGS. 3 and 4. It will be observed that these ferrule components are releasably retained together as a pair, as is apparent in the drawings. With precision grinding techniques, the fit is uniform and predictable, and interchangeability of components is achieved.

Figure 5:
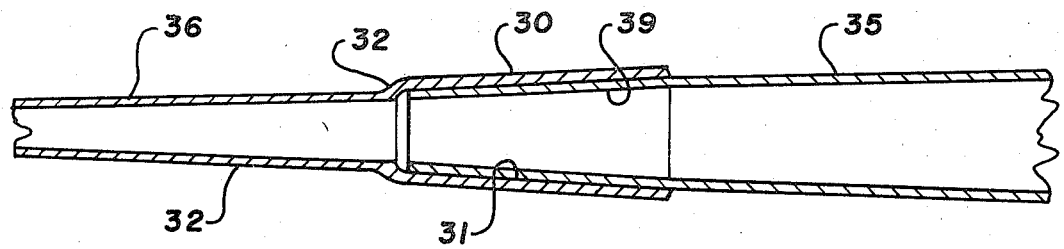
FIG. 5 is a sectional view taken through the diameter of a rod structure and showing the ferrule portion only, with the ferrule structure being modified somewhat from that shown in FIGS. 2–4.
Figure 6:
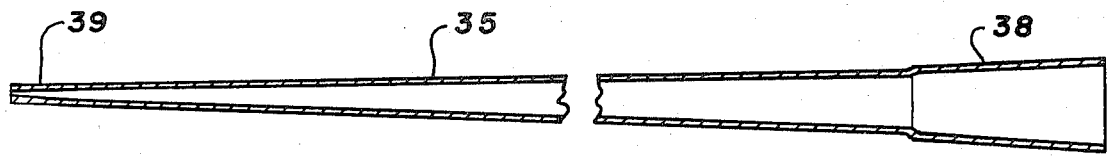
FIG. 6 is a sectional view taken through the diameter of a rod segment, with the center portion being broken away to permit illustration of both ends of the segment.

Attention is now directed to FIGS. 5 and 6 of the drawings wherein a modified form of ferrule structure is illustrated. In this structure, the integral female ferrule or cover portion is provided with an enlarged bell section as is shown at 30. The angular taper of the mandrel which is used to form this element is greater in the area forming the ferrule, such as that which defines the angular taper of the surface 31, as compared to the balance of the integral shaft portion as at 32. Therefore, it is possible to form a smooth merger point which reduces the generation of areas of stress concentration, and also permits the adjustment of the wall thicknesses to achieve few, if any dead spots along the axial extent of the rod. While the transition illustrated in FIG. 5 at the zone identified by reference numeral 32 is relatively sharp, it will be appreciated that, in practice, this zone will be elongated axially so as to provide a minimal indication of abrupt change. In this fashion, therefore, the individual rod segments 35 and 36 are joined together, in the same fashion as the segments are joined in FIGS. 1–4.

FIG. 6 illustrates a rod segment 35, for example, which includes its integral female ferrule portion or cover portion 38, together with its male prong portion as illustrated at 39. In order to accommodate this view, the central portion is broken away, with this portion, as previously indicated, being of substantially continuous taper from one end to the other.

Figure 7:
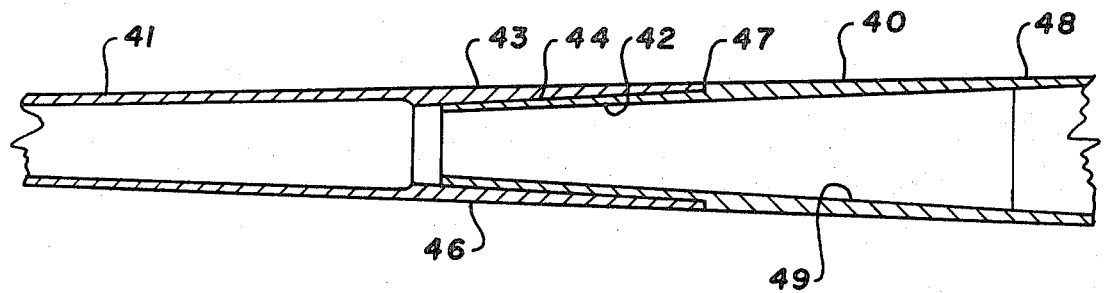
FIG. 7 is a view similar to FIG. 5 and illustrating a still further modification of the ferrule structure of the present invention.

Attention is now directed to FIG. 7 wherein a still further modification of the structure of the present invention is illustrated. In this view, rod segments 40 and 41 are joined together in the manner illustrated by the ferrule construction shown. In this connection, the prong portion is illustrated at 42, while the female ferrule portion is illustrated at 43, and with the mutually adjacent surfaces being shown at 44. The angular taper of the outer surface of the resultant shaft is, as indicated, substantially continuous, and variations in angular degrees of taper are accommodated in the coupling ferrules. The taper of the male prong portion 42 is such that a substantially uniform wall thickness is provided along the axial extent of the prong. In order to accommodate this juncture point, the matching or complimentary taper is formed in the female ferrule portion 43, with the accommodation for this angular difference in taper being shown in an added wall thickness applied to the female portion of the ferrule as at 46. By extending this heavier wall portion beyond the free tip end of the prong portion 42, areas of stress concentration may be avoided. In order to provide for a smooth outer contour, it will be observed that a matching fit is achieved between segments 40 and 41 by means of the treatment of the annularly abutting surfaces as at 47.

It will be observed that the male prong portion has a certain first predetermined axial length, which commences at 48 and extends to the tip end. The inner surface of the prong portion from point 48 and toward the tip end has a certain angular taper which is greater than the angular taper of the axially adjacent outer shaft surface. Furthermore, the prong portion has a tip segment commencing as at 49 with a certain second predetermined axial length which is less than the length of the entire prong portion. The angular taper of the portion defined between numeral 49 and the free tip end substantially matches that of the inner prong surface. This feature provides for a uniform wall thickness for the tip portion of the male ferrule component.

The improved ferrule design of the present invention permits the fabrication of fishing rod structures which are inexpensive, but yet rugged and durable. In addition, replacement segments may be obtained without resorting to individual machining operations. The ferrule structures of the present invention are designed to utilize the materials of construction of the rod shaft, and hence different materials of construction such as metal tubular ferrules or the like are not introduced.

I claim:

1. A fishing rod comprising a thin-walled shaft formed of a plurality of individual segments with the forward end of certain segments being adapted to be mated to the trailing end of the next adjacent forward segment, the segments being adapted to be retained together to form a single unitary composite structure of generally hollow core construction with the rod having a gripping handle at the butt end thereof and with the unitary structure tapering substantially continuously along a certain first predetermined angular taper from the butt end to the tip end thereof;
    a. ferrule means formed integrally with said shaft segments and being arranged to releasably retain said mating segments together as a pair with the mating segments forming a male and a female ferrule component respectively and with the walls of the mating segments being tapered and being retained in mutually abutting relationship, on to another;
    b. said female ferrule component being disposed at the butt end of a shaft segment and comprising a prong-receiving bore having an inner angular taper greater than that of the surrounding outer shaft surface;
    c. said male ferrule component being disposed at the tip end of a shaft segment and comprising a prong tip portion having an outer surface with a certain continuing angular taper, said continuing angular taper being greater than that of the axially adjacent outer shaft surface and substantially matching the taper of said prong-receiving bore, said prong tip portion having a generally uniform wall thickness throughout at least a substantial portion of its length which substantially equals that of the balance of the integral shaft portion.

2. The fishing rod as defined in claim 1 being particularly characterized in that said prong has a thin wall thickness dimension, and is generally of frusto-conical configuration.

3. A fishing rod comprising a thin-walled shaft formed of a plurality of individual segments with the forward end of certain segments being adapted to be mated to the trailing end of the next adjacent forward segment, the segments being adapted to be retained together to form a single unitary composite structure of generally hollow core construction with the rod having a gripping handle at the butt end thereof and with the unitary structure tapering substantially continuously along a certain first predetermined angular taper from the butt end to the tip end thereof;
    a. ferrule means formed integrally with said shaft segments and being arranged to releasably retain said mating segments together as a pair with the mating segments forming a male and a female ferrule component respectively and with the walls of the mating segments being tapered and being retained in mutually abutting relationship, one to another;
    b. said female ferrule component comprising a prong-receiving bore having an inner angular taper greater than that of the surrounding outer shaft surface;
    c. said male ferrule component comprising a prong tip portion having an outer surface with a certain angular taper greater than that of the axially adjacent outer shaft surface and substantially matching the taper of said prong-receiving bore, said prong tip portion having a generally uniform wall thickness throughout at least a substantial portion of its length which substantially equals that of the balance of the integral shaft portion; and said male ferrule component further comprising a male prong portion having a certain first predetermined axial length, the inner surface of said prong portion having a certain angular taper which is greater than the angular taper of the axially adjacent outer shaft surface of said rod segment, said prong portion having a tip segment with a second certain predetermined axial length which is less than said first certain predetermined axial length with the outer surface thereof having an angular taper substantially matching that of said inner prong surface portion.

4. The fishing rod structure as defined in claim 3 being particularly characterized in that a recessed annular abutment surface is formed along the outer surface of the prong portion which mates with the annular free end of the female portion to form a smooth continuous outer surface.

5. A fishing rod comprising a thin-walled shaft formed of a plurality of individual segments with the forward end of certain segments being adapted to be mated to the trailing end of the next adjacent forward segment, the segments being adapted to be retained together to form a single unitary composite structure of generally hollow core construction with the rod having a gripping handle at the butt end thereof and with the unitary structure tapering substantially continuously along a certain first predetermined angular taper from the butt end to the tip end thereof;

a. ferrule means formed integrally with said shaft segments and being arranged to releasably retain said mating segments together as a pair with the mating segments forming a male and a female ferrule component respectively and with the walls of the mating segments being tapered and being retained in mutually abutting relationship, one to another;

b. said female ferrule component comprising a prong-receiving bore having an inner angular taper greater than that of the surrounding outer shaft surface and having an enlarged wall thickness provided in the area of transition between said female ferrule component and rod shaft segment;

c. said male ferrule component comprising a prong-tip portion having an outer surface with a certain angular taper greater than that of the axially adjacent outer shaft surface and substantially matching the taper of said prong-receiving bore, said prong tip portion having a generally uniform wall thickness throughout at least a substantial portion of its length which substantially equals that of the balance of the integral shaft portion.

6. The fishing rod as defined in claim 5 being particularly characterized in that a greater wall thickness is provided in the transition zone between said male ferrule component and rod shaft segment.

* * * * *

UNITED STATES PATENT OFFICE
CERTIFICATE OF CORRECTION

Patent No. 3,830,008            Dated August 20, 1974

Inventor(s) Paul C. Johnson

It is certified that error appears in the above-identified patent and that said Letters Patent are hereby corrected as shown below:

Column 3, line 46, "top" should read -- tip --.

Column 4, line 13, "tio" should read -- tip --.

Column 5, line 53, Claim 1, paragraph a, "on" should read -- one --.

Signed and sealed this 5th day of November 1974.

(SEAL)
Attest:

McCOY M. GIBSON JR.            C. MARSHALL DANN
Attesting Officer            Commissioner of Patents